US007982817B2

(12) United States Patent
Bussiere et al.

(10) Patent No.: US 7,982,817 B2
(45) Date of Patent: Jul. 19, 2011

(54) ROBUST DISPLAY DEVICE HAVING PARTICULAR RIGID BODY

(75) Inventors: Paul A. Bussiere, Twin Mountain, NH (US); Armando Rocha Lopez, El Paso, TX (US); Ralph Jensen, El Paso, TX (US); Kevin A. Patin, El Paso, TX (US); Michael S. Boudreaux, El Paso, TX (US); Wesley B. Morgan, Mesilla, NM (US); David Williams, El Paso, TX (US)

(73) Assignee: Celestica International Inc., Toronto (CA)

( * ) Notice: Subject to any disclaimer, the term of this patent is extended or adjusted under 35 U.S.C. 154(b) by 0 days.

(21) Appl. No.: 12/618,378

(22) Filed: Nov. 13, 2009

(65) Prior Publication Data

US 2010/0118215 A1 May 13, 2010

Related U.S. Application Data

(63) Continuation of application No. PCT/CA2009/001535, filed on Oct. 27, 2009.

(60) Provisional application No. 61/193,103, filed on Oct. 28, 2008.

(51) Int. Cl.
*G02F 1/1333* (2006.01)

(52) U.S. Cl. ........................................... 349/58; 349/60

(58) Field of Classification Search .................... 349/58, 349/60; 361/681
See application file for complete search history.

(56) References Cited

U.S. PATENT DOCUMENTS

| | | | | |
|---|---|---|---|---|
| 5,606,438 | A * | 2/1997 | Margalit et al. | 349/60 |
| 6,417,778 | B2 | 7/2002 | Blum et al. | |
| 6,873,266 | B2 | 3/2005 | Blum et al. | |
| 6,917,301 | B2 | 7/2005 | Blum et al. | |
| 6,977,808 | B2 * | 12/2005 | Lam et al. | 361/679.24 |
| 7,009,523 | B2 | 3/2006 | Blum et al. | |
| 7,109,881 | B2 | 9/2006 | Blum et al. | |
| 7,145,469 | B2 | 12/2006 | Kokonaski et al. | |
| 7,236,098 | B1 | 6/2007 | Kline et al. | |
| 2003/0227446 | A1 | 12/2003 | Ohtsuka | |
| 2005/0270733 | A1 * | 12/2005 | Lam et al. | 361/681 |
| 2007/0171677 | A1 * | 7/2007 | Yano et al. | 362/614 |
| 2008/0055105 | A1 | 3/2008 | Blum et al. | |
| 2008/0079686 | A1 * | 4/2008 | Cernasov | 345/102 |

FOREIGN PATENT DOCUMENTS

| | | | |
|---|---|---|---|
| CN | 200976053 | | 11/2007 |
| WO | WO 2005/114623 | A1 | 12/2005 |
| WO | WO 2008/018233 | A1 | 2/2008 |

OTHER PUBLICATIONS

LCD Backlighting; Pacific Display Devices for all of your LCD needs; http://www.pacificdisplay.com/lcd_backlights.htm; Retrieved from Internet Mar. 7, 2008.

(Continued)

*Primary Examiner* — Mike Qi

(57) ABSTRACT

A flat panel display structure is disclosed that can support significant loads on the viewing surface without fracturing or permanently damaging the video display. A rigid body is fitted in a peripheral frame and situated behind the viewing surface. When a load is applied to the video display, the load is transferred to the rigid body, which absorbs and distributes the load to the peripheral frame.

20 Claims, 2 Drawing Sheets

OTHER PUBLICATIONS

Flasma—Floor mounted display screens; http://www.dvipartnership.co.uk/flasma.htm; Retrieved from internet Mar. 7, 2008.

IntelliMat; http://webarchive.org/web/20080211150841/http://www.intellimat.com/products/specifications.cfm; Retrieved from internet Dec. 17, 2009; First accessed Mar. 11, 2008.

Back Light Modul; XiaMen WeRun Technology Corporation; http://www.cnblm.com/doce/jscs.asp; Retrieved from internet Dec. 17, 2009; First accessed Mar. 11, 2008.

Backlight Module (WRS-5620W4-A0); XiaMen WeRun Technology Corporation; http://www.allproducts.com/manufacture97/weruntech/product3.html; Retrieved from internet Dec. 17, 2009; First accessed Mar. 11, 2008.

Bordovsky; Michal; International Search Report from corresponding PCT Application No. PCT/CA2009/001535; Search completed Jan. 27, 2010.

* cited by examiner

ROBUST DISPLAY DEVICE HAVING PARTICULAR RIGID BODY

CROSS-REFERENCE TO RELATED APPLICATIONS

This application is Continuation Application which claims priority from PCT/CA2009/001535, filed on Oct. 27, 2009, which also claims priority to U.S. Provisional Patent Application Ser. No. 61/193,103, filed on Oct. 28, 2008, the contents of which are incorporated herein by reference.

FIELD OF THE INVENTION

The present invention relates generally to flat panel displays.

DESCRIPTION OF THE PRIOR ART

Flat panel displays, such as Liquid Crystal Displays (LCDs), have become a popular choice for displaying video. Such displays are generally much thinner and lighter than traditional video displays that employ cathode ray tubes, and are therefore suited for a wide variety of applications.

Traditionally, flat panel displays have been mounted in a vertical position for use in products such as televisions, computers, billboards, and the like. Such displays do not expect, and are not designed to accommodate significant loads on their viewing surface. However, it is becoming increasingly popular to consider utilizing flat panel displays in applications in which the display is mounted in a non-vertical position. For example, the flat panel display may be integrated into a floor space to be used for advertising in shopping centers, or it may be integrated into a table top to provide information or entertainment to patrons occupying the table. In such applications, the display device would be expected to accommodate significant loads on or above the viewing surface. Such loads could be dynamic (e.g., pedestrians walking on the display), or could be static (e.g., books, glasses, etc. being placed on the display).

Flat panel displays currently used in such applications generally rely on an external housing structure with the display located within the housing. This acts to protect the viewing surface from direct loading. For example, U.S. Pat. No. 7,145,469 discloses an electronic display device housed within an external supporting structure, which is capable of being placed on a horizontal surface and walked over. The disadvantage of using an external housing structure is that the viewing window is generally comprised of relatively thick glass or plastic, which results in a poor viewing experience due to the problems of parallax and limited viewing angle. In particular, the thicker the protective surface, the greater the refraction of light, and hence the greater the parallax. Such a visual offset diminishes the effectiveness of the display.

U.S. Pat. No. 5,606,438 discloses a ruggedized LCD in which a rigid transparent material such as acrylic is mounted across the back face of the LCD. This arrangement however is provided to enhance the integrity of the display itself but does not contribute to its ability to resist loads in a direction normal to the viewing area.

Many of the LCDs available require backlighting to provide a display with acceptable clarity and visibility. The backlighting is often provided by fluorescent tubes located behind the LCD. Such tubes are inherently fragile and easily damaged if loaded directly by external forces. However, any protective structure used to protect the tubes may also introduce obstructions that interfere with uniform backlighting of the LCD.

It is an object of the present invention to provide a structure in which at least one of the above disadvantages is obviated or mitigated.

SUMMARY OF THE INVENTION

In general terms, the following provides a flat panel display structure that can support significant loads on the viewing surface without fracturing or permanently damaging the video display.

In one embodiment, there is provided a flat panel video display comprising a peripheral frame having opposite side members and a base extending between the side members to define a housing. A rigid body fitted in the housing and supported by the peripheral frame. One or more video display layers are stacked on the rigid body and supported across the extent of the base by the rigid body, such that when a load is applied to the surface of the video layers, the force of the load is transferred to the rigid body and distributed to the peripheral frame.

BRIEF DESCRIPTION OF THE DRAWINGS

Exemplary embodiments will now be described by way of example only with reference to the accompanying drawings, in which.

DETAILED DESCRIPTION

Figure 1:
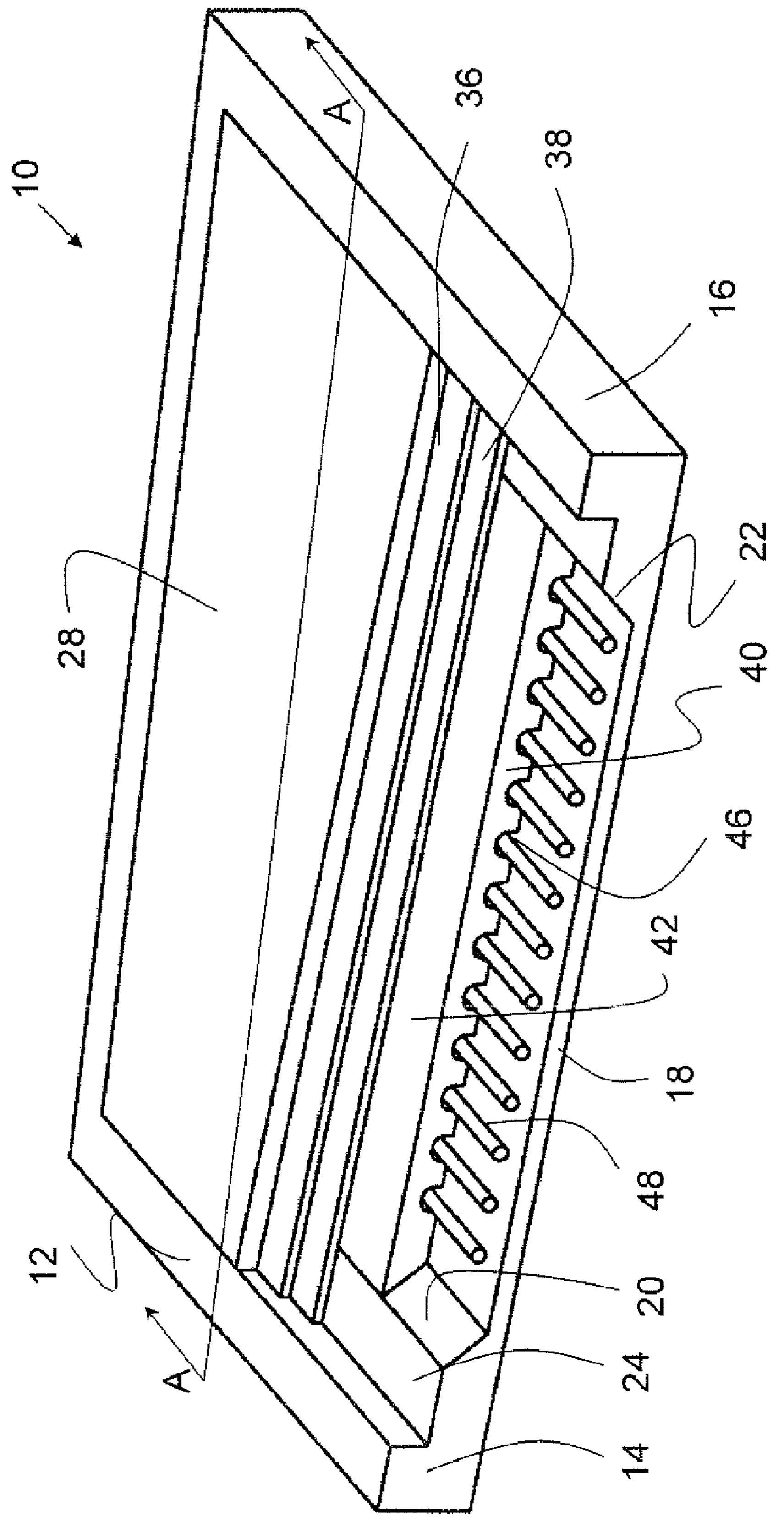
FIG. 1 is a perspective view of a flat panel video display device in which video display layers of the stack are exposed.
Figure 2:
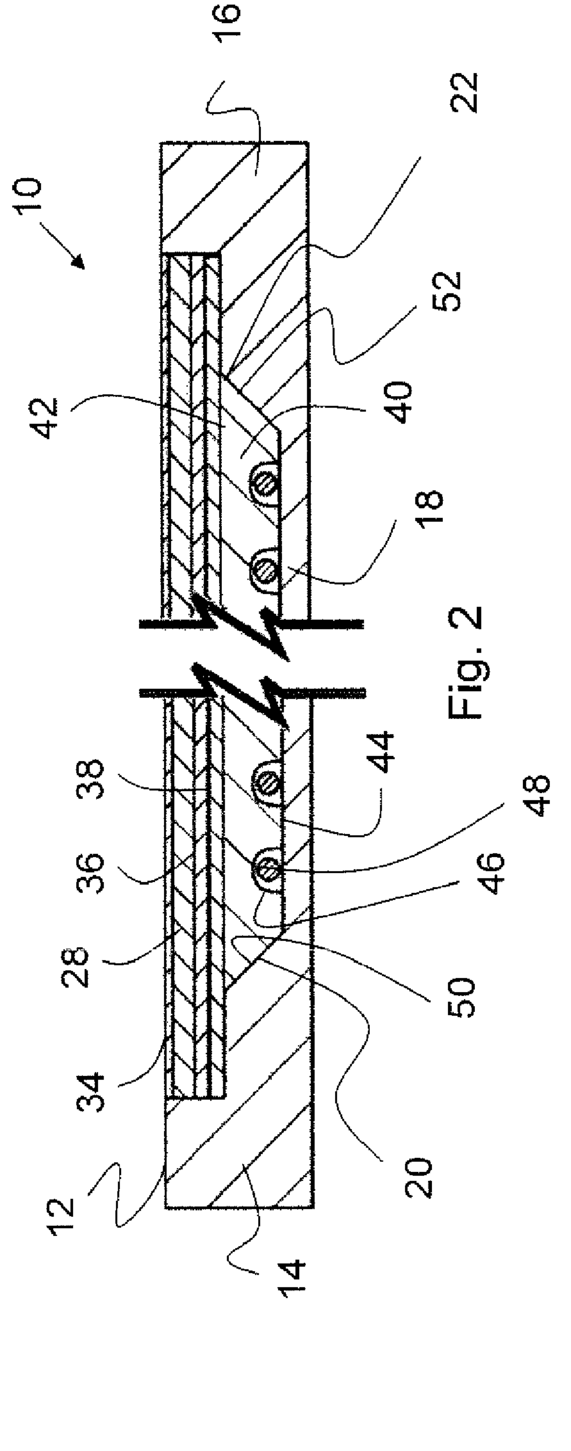
FIG. 2 is a cross-sectional view along line A-A of FIG. 1.

Referring therefore to FIGS. 1 and 2, a flat panel video display structure 10 has a peripheral frame 12. The frame 12 has opposite side members 14, 16 and a base 18 extending between the side members 14, 16 to define a housing. The frame 12 and base 18 may be made from a reinforced resin that is molded to shape or may be fabricated from sheet material if preferred.

The side members 14, 16 each have inwardly directed faces 20, 22 that are inwardly inclined toward the base 18. A recess 24 is formed around the upper edge of the side members.

The frame 12 accommodates a backlit liquid crystal display (LCD) unit. The unit has an LCD 28 that is standard in the art and includes a liquid crystal layer sandwiched between two polarizing filters. The LCD 28 further includes a transparent front protective sheet 34 such as thin glass.

The edges of the protective sheet 34 are supported in the recess 24 so as to be flush with the upper surface of the frame 12.

If necessary, situated behind the LCD 28 is a light transmissive layer of material 36 for filling any void that may be present in the stack, for example due to the shape of frame 12. As an example, filling material 36 may comprise elastomer, glass, or virtually any other suitable material that is light transmissive. As will be described below, the purpose of the filling material 36 is to fill any voids in the stack so that there are substantially no voids between the LCD 28 and the rigid support 40, such that when a load is applied to the LCD 28, it may be transferred to the support 40.

Behind the layer of filling material 36 are one or more layers of diffusers 38. Such diffusers 38 are well-known in the art and are utilized to diffuse the backlight such that the intensity and/or brightness of the backlight is uniform across the back of the LCD 28. The number of layers of diffusers 38 will vary depending on the LCD 28 and may be reduced or eliminated depending on the amount of diffusion provided by rigid support 40 (as will be explained below). Three layers of diffusers 38 are shown in FIG. 1 for illustrative purposes only.

Located behind the diffusers 38 is a light transmissive rigid support 40 made of a rigid body. The support 40 has a planar top surface 42 in engagement with the diffusers 38 and a rear surface 44 abutting the base 18. The rear surface 44 has part cylindrical channels 46 integrally formed and house fluorescent bulbs or tubes 48, which supply backlighting. The fluorescent tubes 48 are mounted to the backlighting unit (not shown), as is standard in the art.

The outer edges 50, 52 of the support 40 are sloped inwardly so as to be complementary to the inwardly directed faces 20, 22 of side members 14, 16. When the support 40 is installed, the edges 50, 52 snugly engage the faces 20, 22 as the rear surface 44 engages the base 18.

The support 40 is thus fully supported around its edges 50, 52 by the frame 12 and is positioned to provide support across the full area of the LCD 28. The protective glass sheet 32, LCD 28, optional filling material 36, and diffusers 38 are also supported by the recess 24 around the periphery of the frame 12. The channels 46 also provide protection for the tubes 48.

Advantageously, the material of the support 40 may be chosen to have the desired optical characteristics that allow the light from the tubes 48 to be diffused and/or uniformly distributed across the diffusers 38. For example, a surface finish may be added into the mold used to form the support 40 or applied after the casting process to facilitate diffusion of the backlighting as the light from the backlighting it transmitted through and/or exits support 40. Such a finish may be provided by sand blasting, casting, acid etching, or any other techniques that create the desired diffusing effect. Whilst not required, such a finish complements the diffusers 38 in the stack and helps ensure that the light intensity and/or brightness is uniform across the back of the video display. It may even be possible to reduce or eliminate the diffusers 38 in some embodiments.

In use, when a load is applied to the display structure 10 in a direction normal to the LCD 28, for example, when a pedestrian walks on the protective sheet 34, the load is transferred through layers 36 and 38 to the rigid support 40, which acts to absorb and distribute the load uniformly to the base 18 and sides 14, 16 of the frame. The provision of the support 40 integrated into the stack of the flat panel display 10 allows the display to support significant loads without utilizing an external support or housing. This avoids the disadvantages associated with an external support structure, such as having an external viewing window of thick glass or plastic covering the display. Also, such a structure is particularly well-suited to embodiments in which touch-screen applications are supported since the touch screen sensor may be placed directly on the display device itself.

Figure 3:
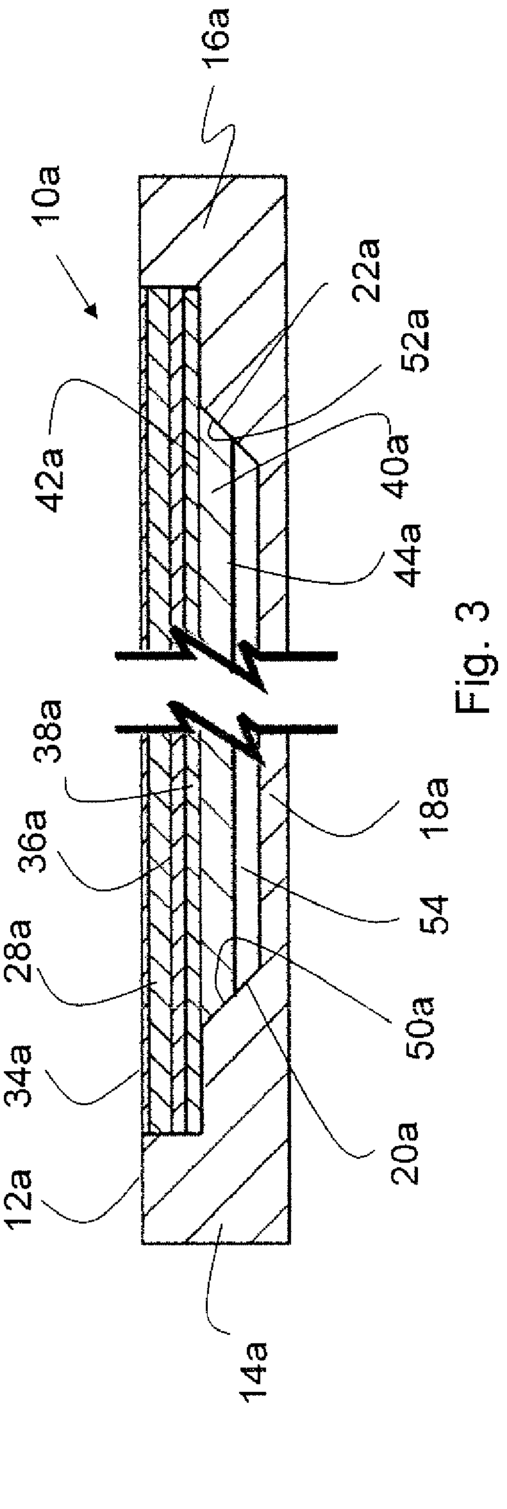
FIG. 3 is an alternative embodiment of the flat panel display device shown in FIGS. 1 and 2.

FIG. 3 shows an alternative embodiment in which like components are denoted by like reference numerals with a suffix ‘a’ added for clarity. In this embodiment, the base 18*a* of frame 12*a* does not bear any of the load applied to support 40*a*. Instead, support 40*a* acts like a beam and transfers the full force of its load to the sides 14*a*, 16*a* of the frame 12*a*. This is achieved by sloping the inwardly directed faces 20*a*, 22*a* of frame 12*a* and cooperating outer edges 50*a*, 52*a* of support 40*a* to prevent the support 40*a* from abutting base 18*a*. Therefore, when a load is applied, the support 40*a* acts to distribute the load uniformly to sides 14*a*, 16*a* of the frame 12*a*. In this embodiment, backlighting (not shown) and/or other components may be placed in void 54 between base 18*a* and support 40*a*.

It will be understood that in the above-described embodiments, the panel display 10 will incorporate the normal controls and power supplies within the construction, but that these have been omitted for clarity.

Although the invention has been described with reference to certain specific embodiments, various modifications thereof will be apparent to those skilled in the art without departing from the spirit and scope of the invention as outlined in the claims appended hereto.

For example, the specific arrangement of the layers of the stack described above is only one particular way of arranging the layers. It will be appreciated that the stack layers may be arranged differently without departing from the spirit or scope of the invention, provided that the provision of the rigid support 40 is included to absorb any load applied to the display structure 10. As an example, one may wish to have an LCD polarizing filter sandwiched between two layers of diffusers. Such a modification, and others of a similar nature, do not affect the object of the invention.

It will be appreciated that the rigid support 40 may be applied to a variety of video display technologies that are utilized in flat panel display stack systems. For example, in a flat panel display using plasma video display technology, the support 40 is situated behind the plasma display layer with (if necessary) appropriate filling material 36 intermediate the plasma display and the support 40. In operation, the support 40 provides the same functionality as when an LCD is used, that is as a load is applied to the plasma display, the force is transferred through the filling material 36 (if present) and to the support 40, which acts to distribute the load uniformly to the frame 12. To this end, it will be appreciated that the provision of the rigid support 40 is independent of the video display technology and therefore may be integrated into a wide variety flat panel video displays.

What is claimed is:

1. A flat panel video display comprising:

(a) a peripheral frame having opposite side members and a base extending between said side members to define a housing;

(b) a rigid body fitted in said housing and supported by said peripheral frame said rigid body having a support surface directed away from said base and extending between said side members across said base; and (c) one or more video display layers stacked on said rigid body and supported across the extent of said base by said support surface of said rigid body;

whereby a load applied to said one or more layers is transferred through said support surface to said rigid body and distributed to said peripheral frame.

2. The flat panel video display of claim 1 wherein said one or more video display layers includes a liquid crystal display (LCD), and said backlighting is interposed between said LCD and said base.

3. The flat panel video display of claim 2 wherein cylindrical channels are integrally formed in said rigid body, and wherein bulbs providing said backlighting are housed in said cylindrical channels.

4. The flat panel video display of claim 3 wherein a recess is formed around upper edges of said opposite side members, and wherein said video display layers are supported by said recess around the periphery of said peripheral frame.

5. The flat panel video display of claim 4 wherein each of said opposite side members includes an inwardly directed face inwardly inclined toward said base, and wherein outer edges of said rigid body are sloped inwardly so as to complement said inwardly directed faces and snugly engage said inwardly directed faces.

6. The flat panel video display of claim 5 wherein said rigid body is light transmissive, said rigid body abuts said base, and said cylindrical channels are adjacent said base.

7. The flat panel video display of claim 4 wherein said one or more video display layers further includes at least one light diffuser interposed between said LCD and said backlighting.

8. The flat panel video display of claim 4 wherein said one or more video display layers further includes a light transmissive filler material interposed between said LCD and said rigid body to eliminate a void between said LCD and said rigid body.

9. The flat panel video display of claim 8 wherein said light transmissive filler material is an elastomer.

10. The flat panel video display of claim 2 wherein said rigid body has optical characteristics that facilitate diffusion of said backlighting.

11. The flat panel video display of claim 10 wherein said rigid body comprises a light transmissive material having a finish to facilitate diffusion of said backlighting.

12. The flat panel video display of claim 2 wherein said rigid body is light transmissive, wherein a recess is formed around upper edges of said opposite side members, and wherein said video display layers are supported by said recess around the periphery of said peripheral frame.

13. The flat panel video display of claim 12 wherein each of said opposite side members includes an inwardly directed face inwardly inclined toward said base, and wherein outer edges of said rigid body are sloped inwardly so as to complement said inwardly directed faces and snugly engage said inwardly directed faces.

14. The flat panel video display of claim 13 wherein said rigid body is supported by said peripheral frame by said inwardly directed faces, and said rigid body is spaced from said base to define a void between said base and said rigid body.

15. The flat panel video display of claim 14 wherein bulbs providing said backlighting are placed in said void.

16. The flat panel video display of claim 15 wherein said rigid body has optical characteristics that facilitate diffusion of said backlighting.

17. The flat panel video display of claim 16 wherein said rigid body comprises a light transmissive material having a finish to facilitate diffusion of said backlighting.

18. The flat panel video display of claim 15 wherein said one or more video display layers further includes at least one light diffuser interposed between said LCD and said rigid body.

19. The flat panel video display of claim 15 wherein said one or more video display layers further includes a light transmissive filler material interposed between said LCD and said rigid body to eliminate a void between said LCD and said rigid body.

20. The flat panel video display of claim 19 wherein said light transmissive filler material is an elastomer.

* * * * *